United States Patent
Meskan et al.

(10) Patent No.: US 10,663,106 B1
(45) Date of Patent: May 26, 2020

(54) TV WALL MOUNT

(71) Applicant: NEXUS 21, INC., Scottsdale, AZ (US)

(72) Inventors: Jeffrey Meskan, Scottsdale, AZ (US); Cory Lovett, Scottsdale, AZ (US)

(73) Assignee: NEXUS 21, Inc., Scottsdale, AZ (US)

( * ) Notice: Subject to any disclaimer, the term of this patent is extended or adjusted under 35 U.S.C. 154(b) by 0 days.

(21) Appl. No.: 16/173,756

(22) Filed: Oct. 29, 2018

Related U.S. Application Data

(60) Provisional application No. 62/722,711, filed on Aug. 24, 2018.

(51) Int. Cl.
| | | |
|---|---|---|
| *F16M 11/18* | (2006.01) | |
| *F16M 11/08* | (2006.01) | |
| *F16M 13/02* | (2006.01) | |
| *F16M 11/38* | (2006.01) | |

(52) U.S. Cl.
CPC .............. *F16M 11/18* (2013.01); *F16M 11/08* (2013.01); *F16M 11/38* (2013.01); *F16M 13/02* (2013.01); *F16M 2200/061* (2013.01)

(58) Field of Classification Search
USPC ...................................................... 248/282.1
See application file for complete search history.

(56) References Cited

U.S. PATENT DOCUMENTS

| | | | | |
|---|---|---|---|---|
| 7,663,478 | B2* | 2/2010 | Oh ......................... | F16M 11/08 340/384.1 |
| 7,878,470 | B2* | 2/2011 | Oh ......................... | F16M 11/10 248/278.1 |
| 8,245,990 | B2* | 8/2012 | Huang ................... | F16M 11/10 248/276.1 |
| 8,684,325 | B1* | 4/2014 | Beshara ................. | F16M 13/02 248/274.1 |
| 10,139,045 | B1* | 11/2018 | Keuter ................... | F16M 13/02 |
| 2007/0053151 | A1* | 3/2007 | Capoferri ............... | F16M 11/10 361/679.21 |
| 2007/0096606 | A1* | 5/2007 | Ryu ....................... | F16M 11/08 312/7.2 |
| 2007/0258200 | A1* | 11/2007 | Choi ...................... | F16M 11/14 361/679.06 |
| 2007/0284494 | A1* | 12/2007 | Choi ...................... | F16M 11/18 248/274.1 |
| 2008/0001048 | A1* | 1/2008 | Woo ....................... | F16M 11/10 248/276.1 |

(Continued)

*Primary Examiner* — Monica E Millner
(74) *Attorney, Agent, or Firm* — Schmeiser, Olsen & Watts LLP

(57) ABSTRACT

A motorized articulating TV wall mount is provided. The wall mount may include a housing having an interior space and an opening. The mount includes articulating arms operatively coupled to a rear wall of the housing, wherein the articulating arms are moveable between an extended position and a retracted position. The extended position includes the articulating arms extending through the opening of the housing and the retracted position includes the articulating arms within the inner space and not extending through the opening. The mount includes a tv mounting member coupled to the articulating arms, wherein the articulating arms are coupled between the housing and the tv mounting member. Additionally, the mount includes a cable management system coupled to the articulating arms. The wall mount may be installed in-wall or on-wall without modification to the components.

3 Claims, 22 Drawing Sheets

(56) References Cited

U.S. PATENT DOCUMENTS

| | | | |
|---|---|---|---|
| 2008/0016650 A1* | 1/2008 | Moon | F16M 11/10 16/334 |
| 2010/0090077 A1* | 4/2010 | Grabania | F16M 11/08 248/296.1 |
| 2011/0198456 A1* | 8/2011 | Fiedler | F16M 11/08 248/122.1 |
| 2011/0248128 A1* | 10/2011 | Oh | F16M 11/041 248/201 |
| 2018/0313646 A1* | 11/2018 | Hodowany | H04Q 9/00 |
| 2019/0072231 A1* | 3/2019 | Newville | F16M 11/046 |

* cited by examiner

TV WALL MOUNT

CROSS REFERENCE TO RELATED APPLICATION[S]

This application claims priority to U.S. Provisional Patent Application entitled "TV Wall Mount," Ser. No. 62/722,711, filed Aug. 24, 2018, the disclosure of which is hereby incorporated entirely herein by reference.

BACKGROUND OF THE INVENTION

Technical Field

This invention relates generally to a TV wall mount and more particularly to a motorized articulating TV wall mount for in-wall and on-wall installations.

State of the Art

As TV screens become larger and thinner, and with the advent of ambient screen technologies that solve the problem of the "dark rectangle on the wall" when the TV is turned off, more people will be mounting their TV screens on the walls of their homes. Home décor is trending to be oriented to serve many purposes, not just to face a TV screen. There are many situations where it is desirable to place a TV on the wall, but where the seating arrangement is not directly facing that wall, or where there are multiple viewing angles needed in the same room. One common solution for this is to use a manual articulating wall mount, allowing the user to pull the screen away from the wall and turn it to face the desired viewing area. This solution is quickly becoming less desirable because the mounts are too bulky and look bad with the current and upcoming very-thin OLED and QLED TV screens, holding them many inches from the wall. Many TV's will now come with built-in gapless wall mounts, thereby raising the bar for expectation of having the TV flat against the wall. Additionally, the thinner the TV, the less desirable it will be to have homeowners grab the TV and manually pull on it because of possible damage to the screen. An alternative solution has been to use a motorized articulating wall mount. These have been avoided these because they are bulky and they also have the disadvantage of accidental breakage of the motorization by users who mistakenly assume the mount operates manually. Users often push or pull the TV into position, thereby breaking the gears in the motors.

SUMMARY OF THE INVENTION

The present invention relates to a motorized articulating TV wall mount for in-wall and on-wall installations wherein the mount is concealed from view.

An embodiment includes a motorized articulating TV wall mount comprising a housing having an interior space and an opening; articulating arms operatively coupled to a rear wall of the housing, wherein the articulating arms are moveable between an extended position and a retracted position, wherein the extended position includes the articulating arms extending through the opening of the housing and the retracted position includes the articulating arms within the inner space and not extending through the opening; a tv mounting member coupled to the articulating arms, wherein the articulating arms are coupled between the housing and the tv mounting member; and a cable management system coupled to the articulating arms.

Another embodiment includes a motorized articulating TV wall mount comprising: a housing having an interior space and an opening; articulating arms operatively coupled to a rear wall of the housing, wherein the articulating arms are moveable between an extended position and a retracted position, wherein the extended position includes the articulating arms extending through the opening of the housing and the retracted position includes the articulating arms within the inner space and not extending through the opening; a tv mounting member coupled to the articulating arms, wherein the articulating arms are coupled between the housing and the tv mounting member; a motorized drive system, wherein the motorized drive system is a direct drive comprising a slip clutch coupled to the direct drive, the motorized drive system operating to move the articulating arms; and a cable management system coupled to the articulating arms. The tv mounting member swivels to adjust the viewing orientation of a TV coupled to the tv mounting member.

Another embodiment includes a motorized articulating TV wall mount installable in an on-wall installation or an in-wall installation, the mount comprising: a housing having an interior space and an opening; articulating arms operatively coupled to a rear wall of the housing, wherein the articulating arms are moveable between an extended position and a retracted position, wherein the extended position includes the articulating arms extending through the opening of the housing and the retracted position includes the articulating arms within the inner space and not extending through the opening; a tv mounting member coupled to the articulating arms, wherein the articulating arms are coupled between the housing and the tv mounting member; a motorized drive system, wherein the motorized drive system is a direct drive comprising a slip clutch coupled to the direct drive, the motorized drive system operating to move the articulating arms, wherein the slip clutch moves from an engaged position to a slip condition in response to an external force applied to the tv mounting member, wherein the external force results in increasing the load torque of the motorized drive system above operating load torque; and a cable management system coupled to the articulating arms, wherein the cable management system accommodates cables of any thickness.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
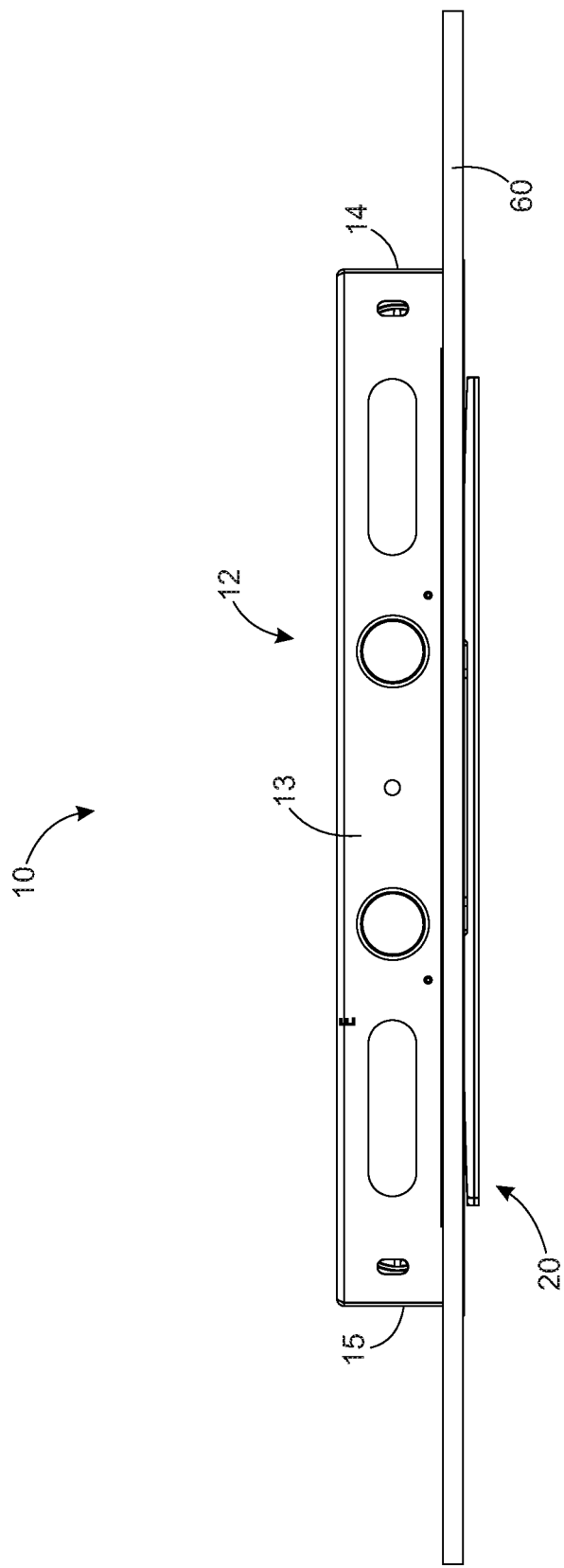
FIG. 1 is a top view of a TV wall mount in an in-wall installation and retracted position according to an embodiment.
Figure 2:
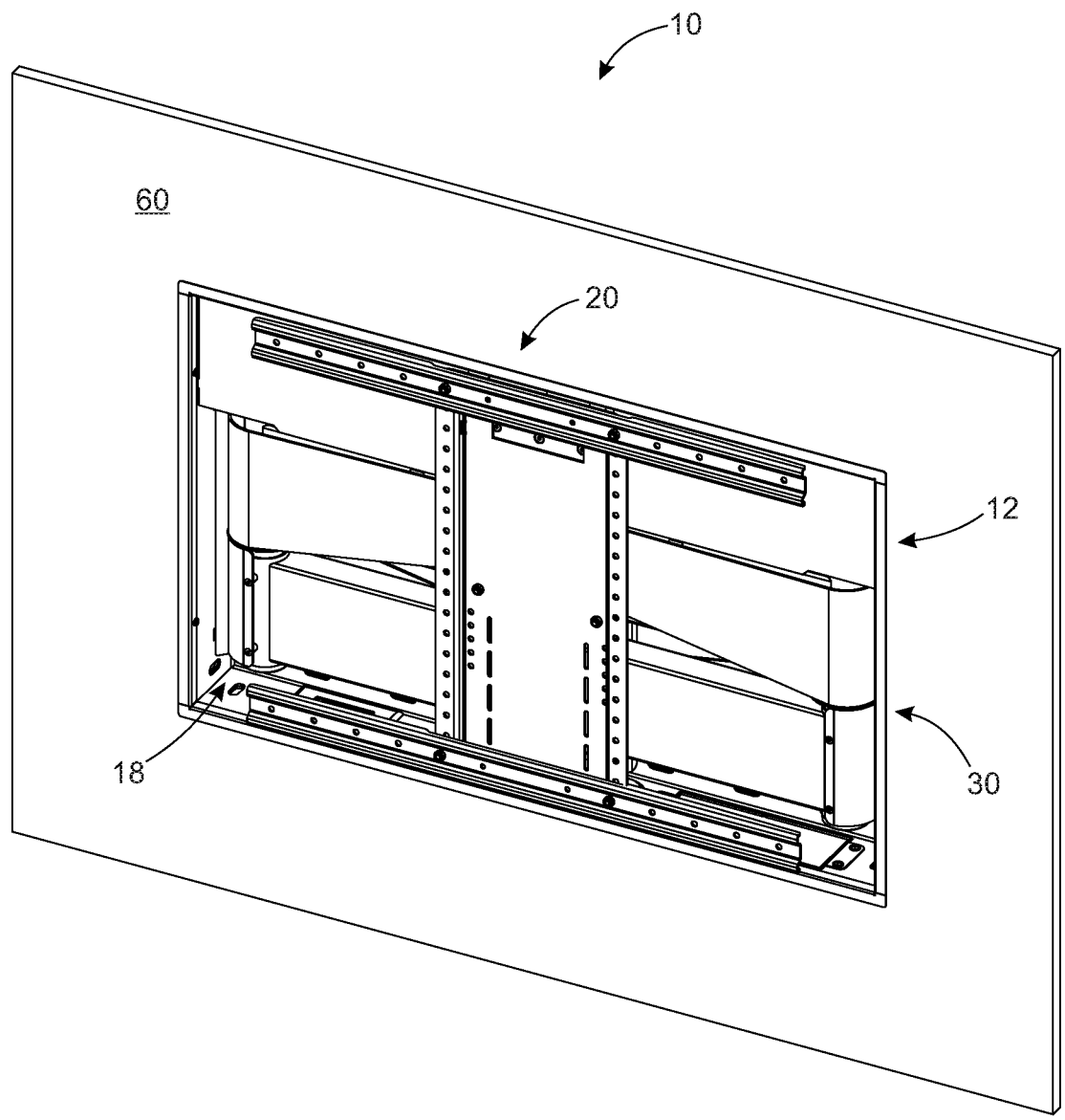
FIG. 2 is a perspective view of a TV wall mount in an in-wall installation and retracted position according to an embodiment.
Figure 3:
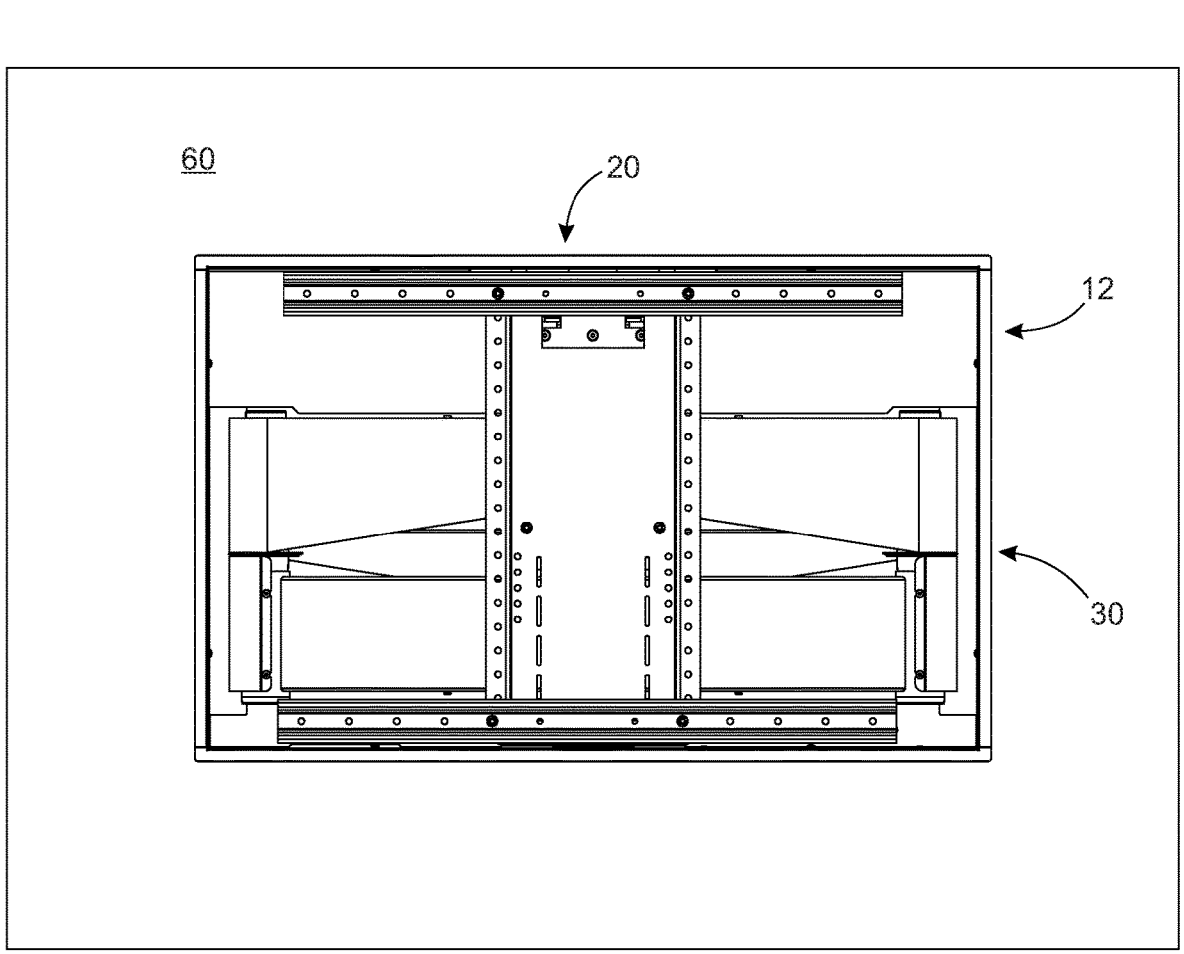
FIG. 3 is a front view of a TV wall mount in an in-wall installation and retracted position according to an embodiment.
Figure 4:
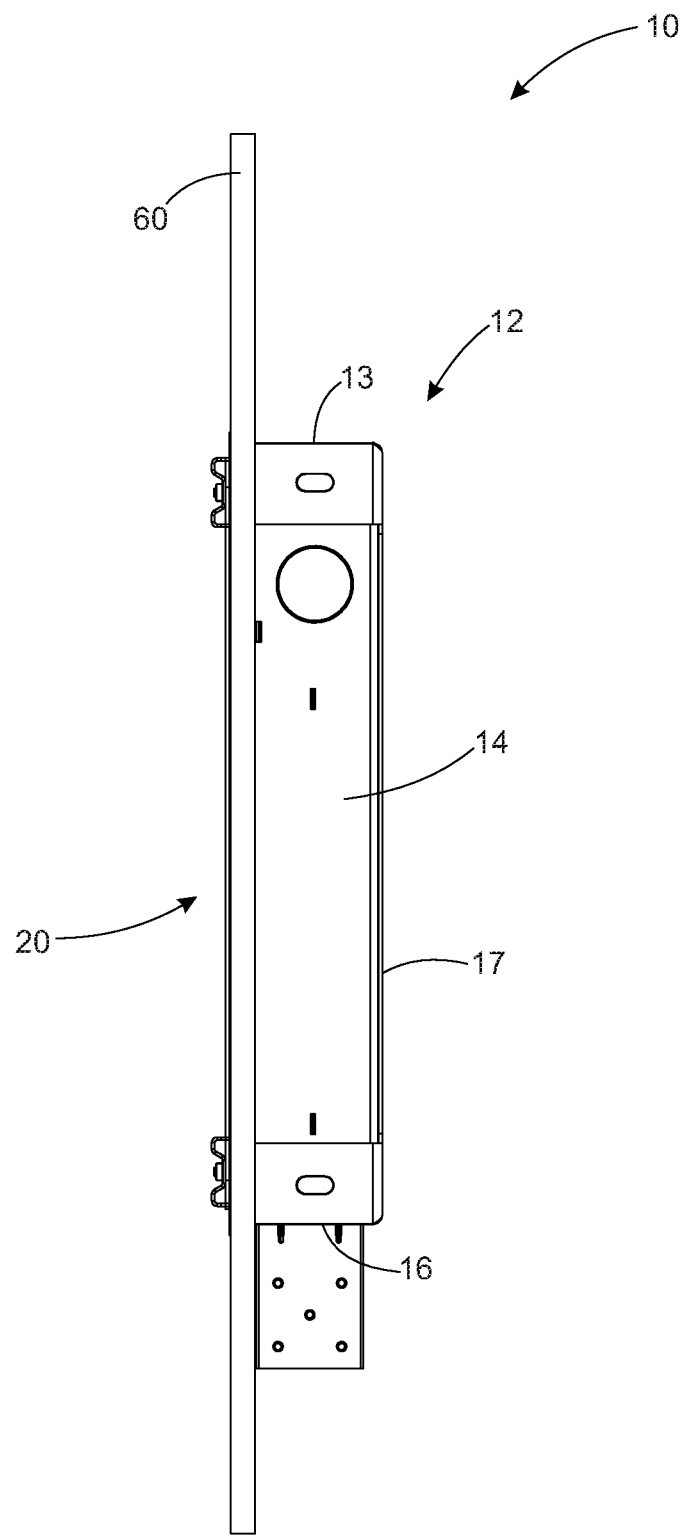
FIG. 4 is a side view of a TV wall mount in an in-wall installation and retracted position according to an embodiment.
Figure 5:
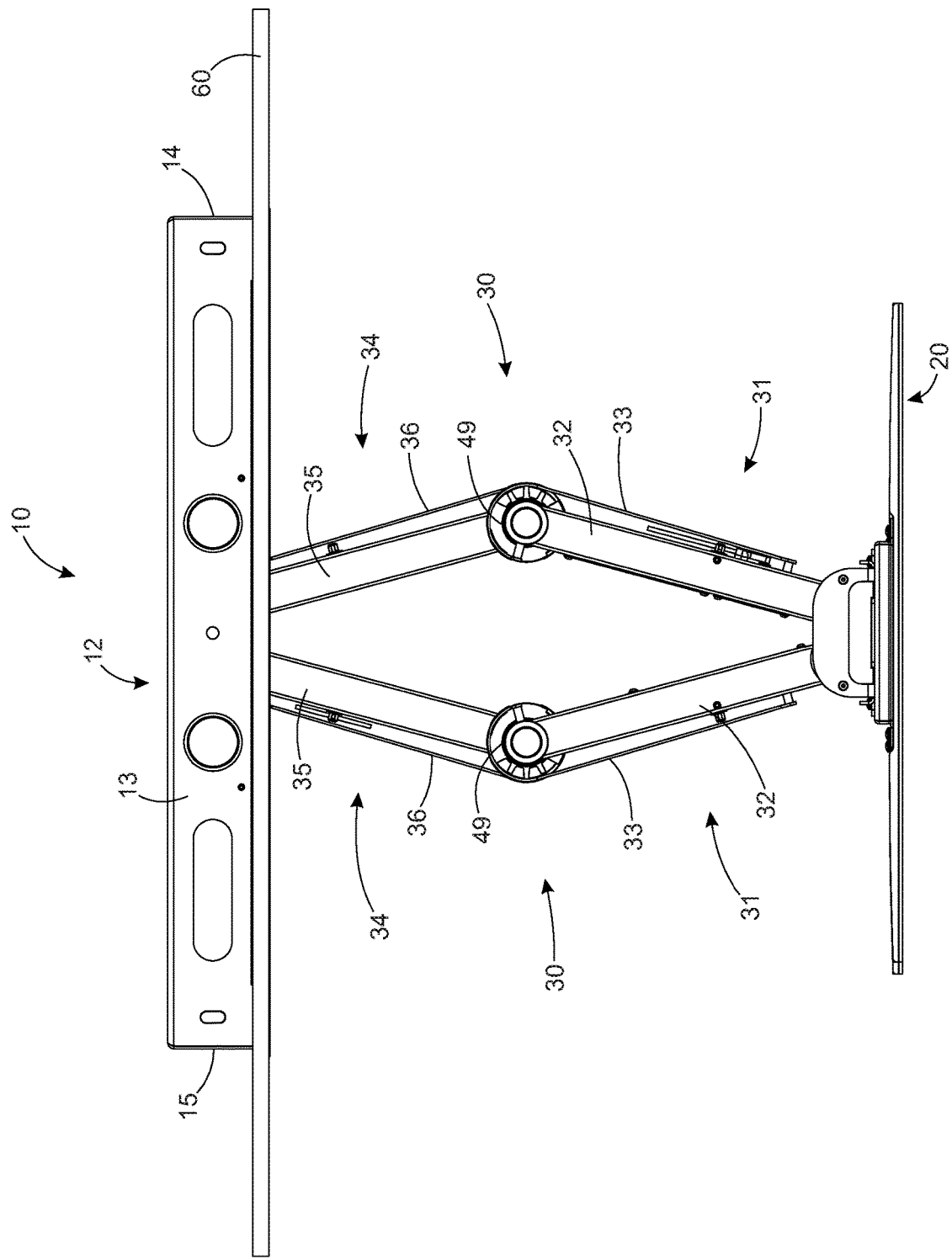
FIG. 5 is a top view of a TV wall mount in an in-wall installation and extended position according to an embodiment.
Figure 6:
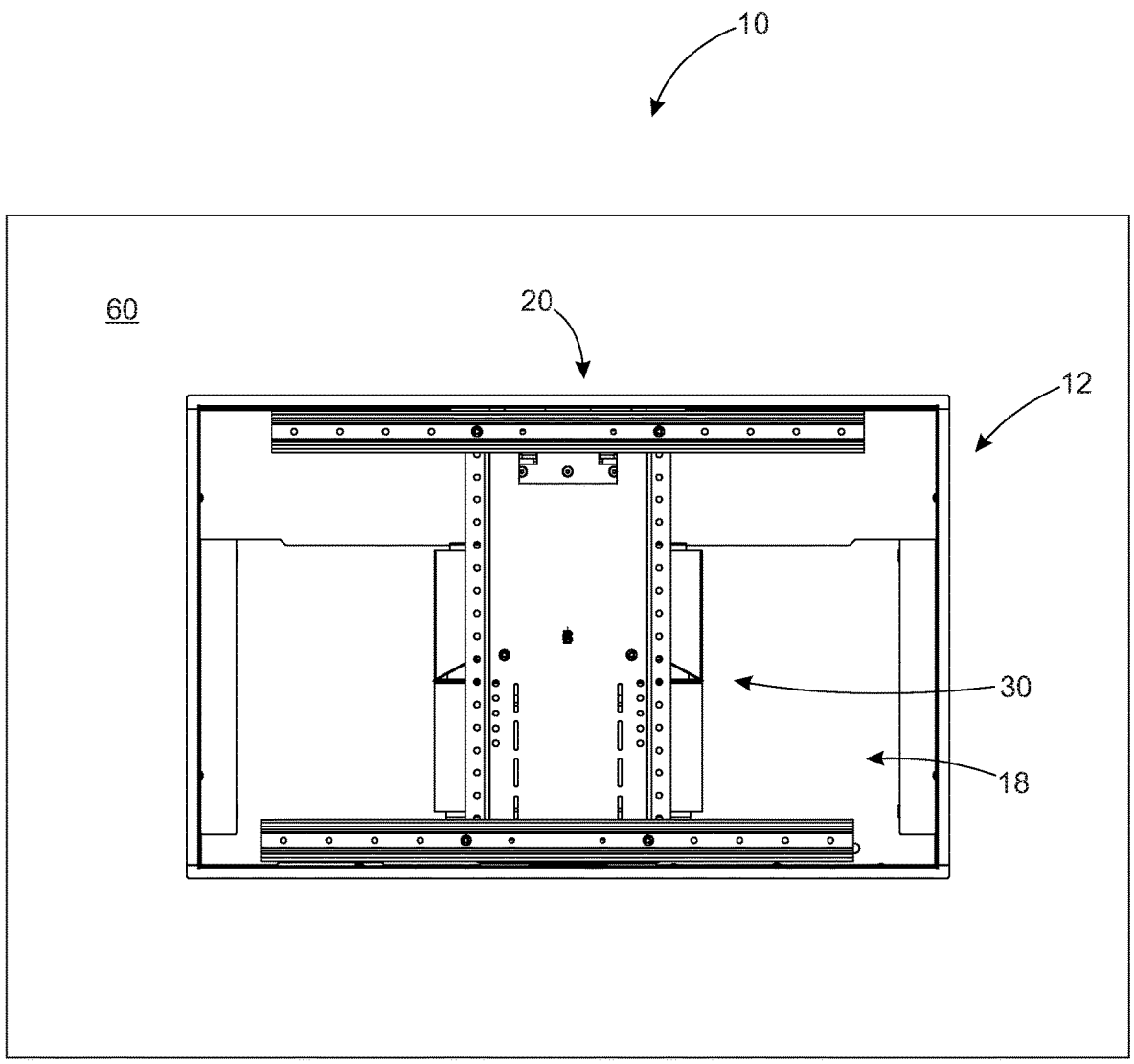
FIG. 6 is a front view of a TV wall mount in an in-wall installation and extended position according to an embodiment.
Figure 7:
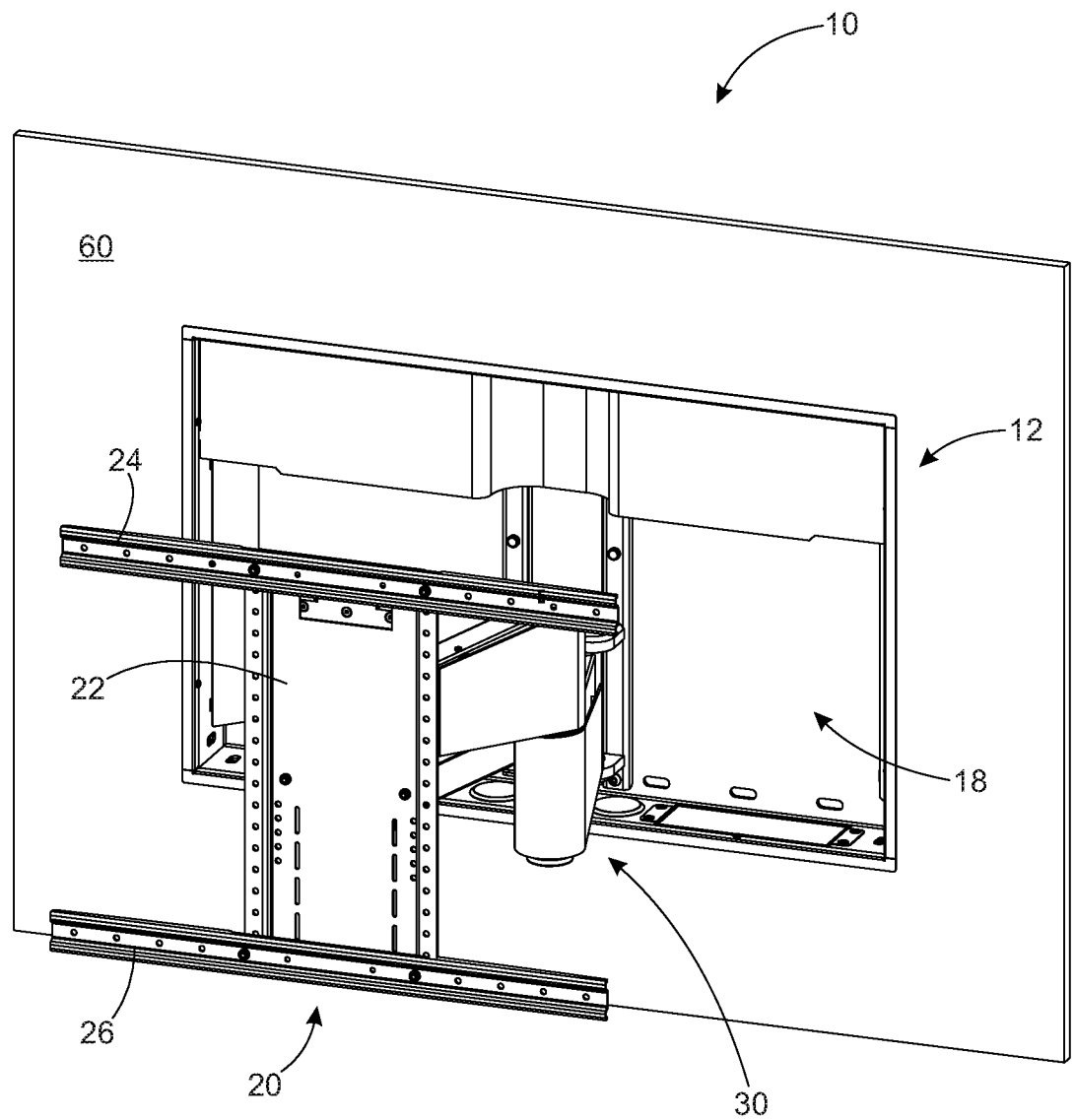
FIG. 7 is a perspective view of a TV wall mount in an in-wall installation and extended position according to an embodiment.
Figure 8:
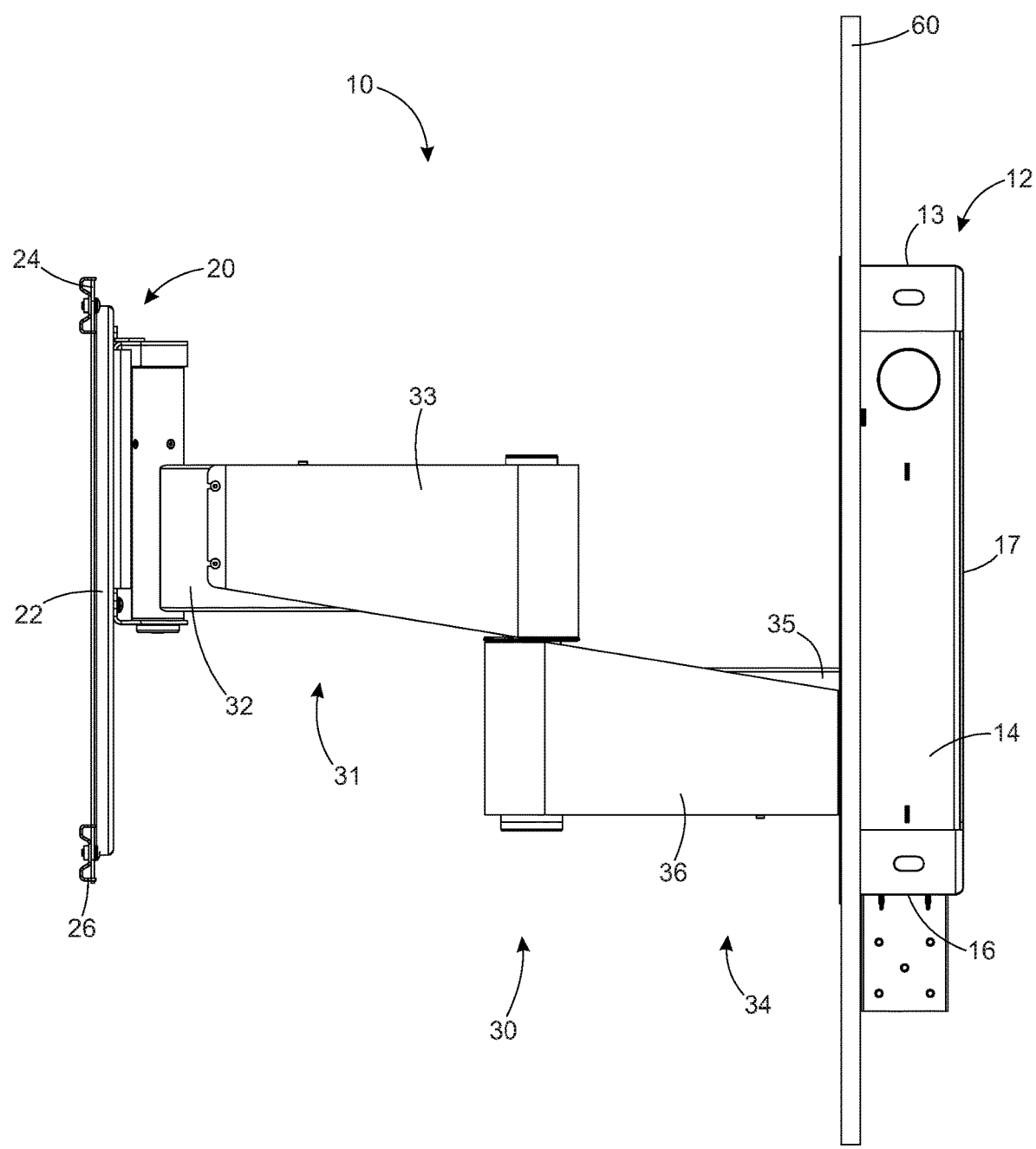
FIG. 8 is a side view of a TV wall mount in an in-wall installation and extended position according to an embodiment.
Figure 9:
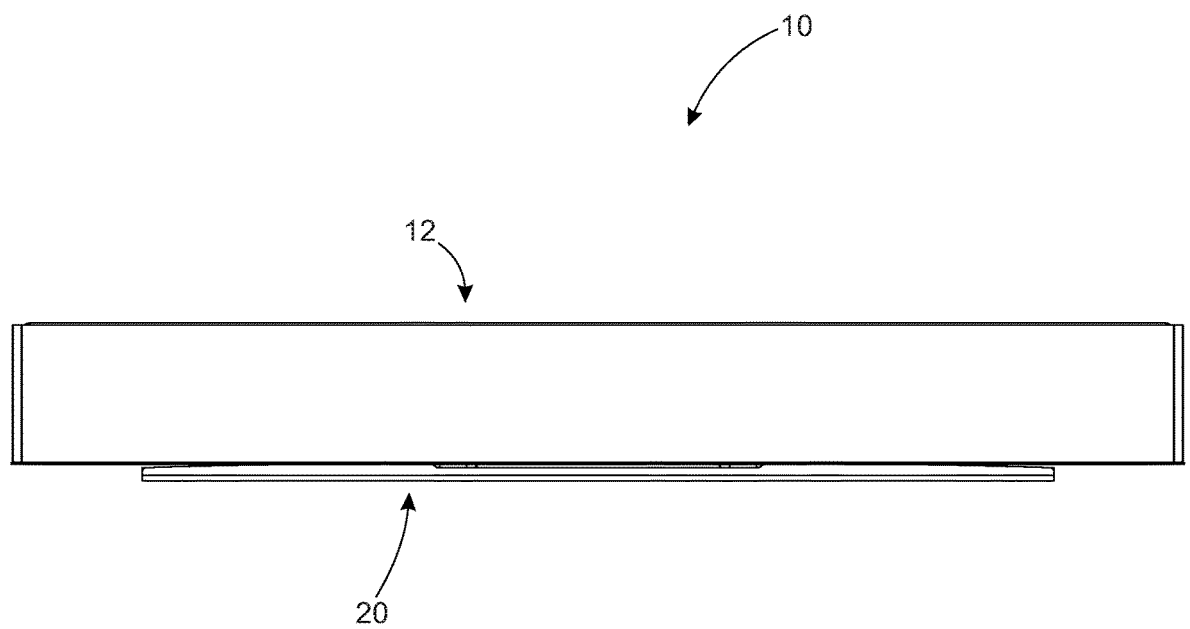
FIG. 9 is a top view of a TV wall mount in an on-wall installation and retracted position according to an embodiment.
Figure 10:
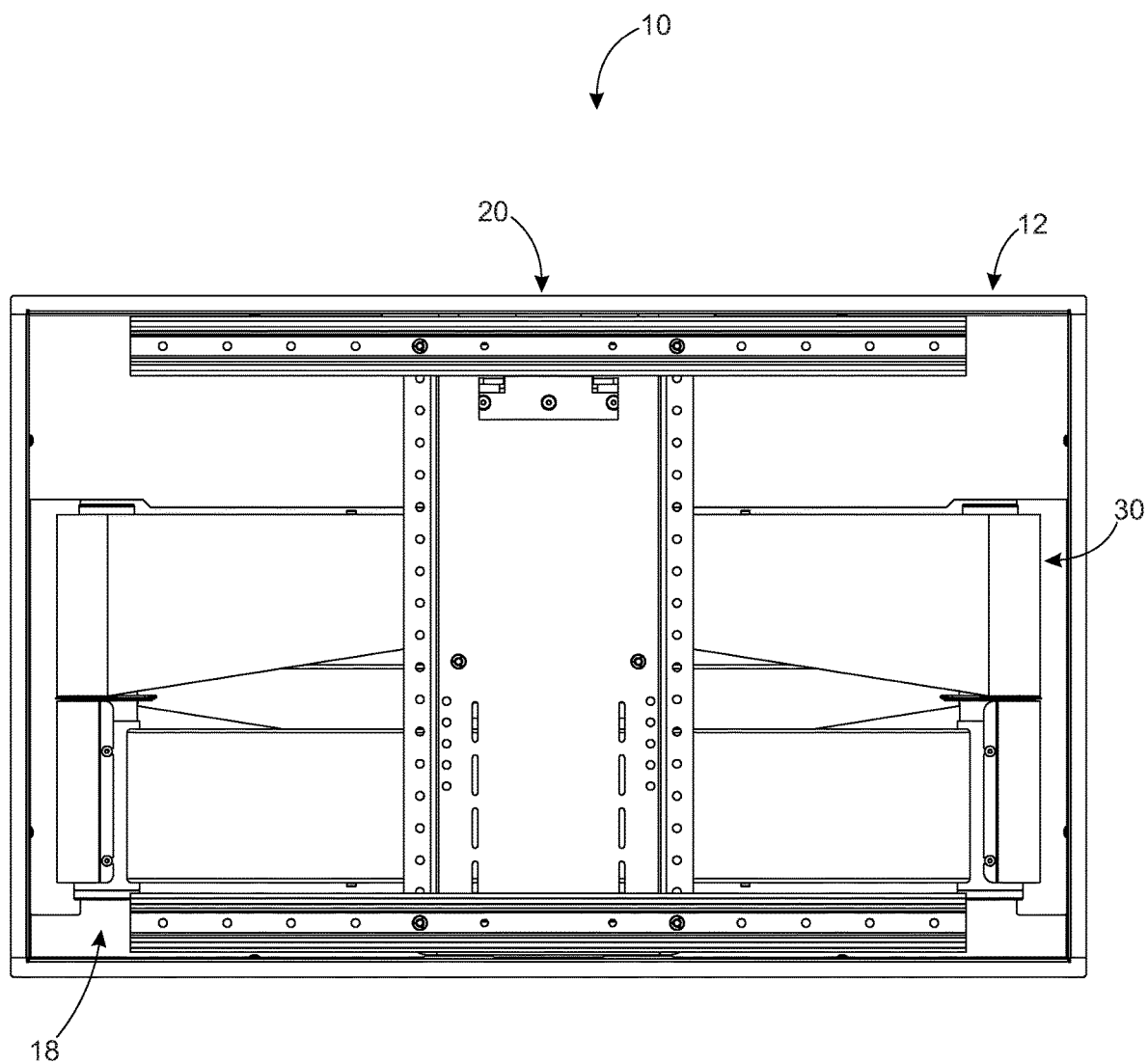
FIG. 10 is a front view of a TV wall mount in an on-wall installation and retracted position according to an embodiment.
Figure 11:
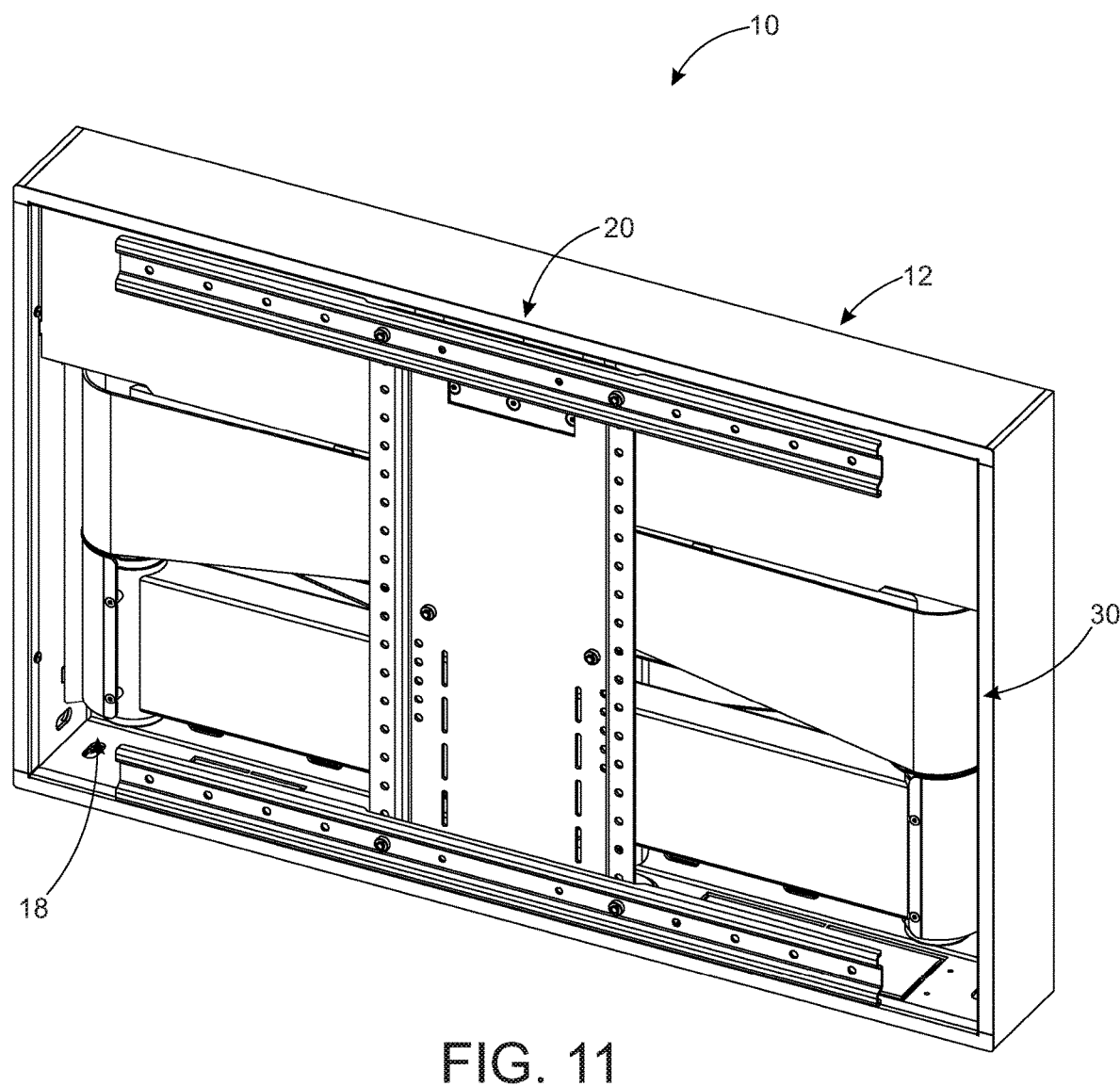
FIG. 11 is a perspective view of a TV wall mount in an on-wall installation and retracted position according to an embodiment.
Figure 12:
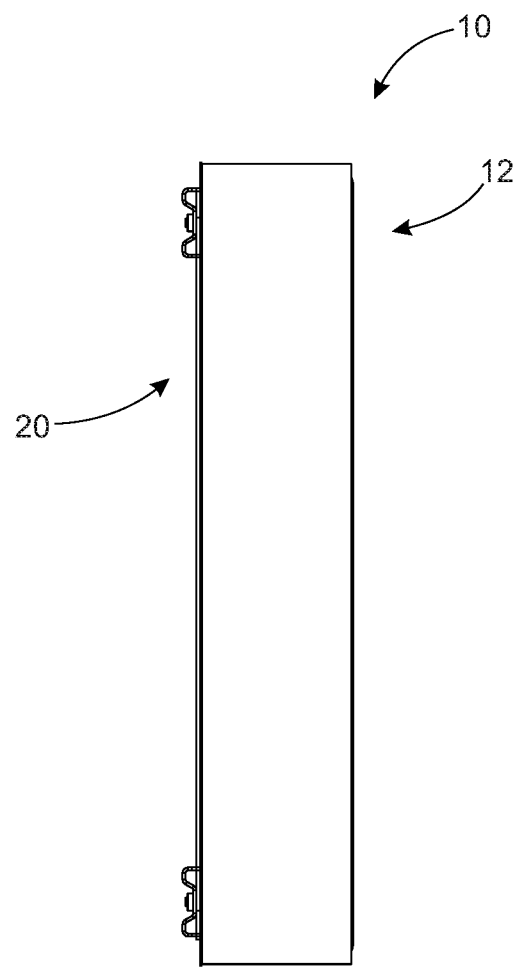
FIG. 12 is a side view of a TV wall mount in an on-wall installation and retracted position according to an embodiment.
Figure 13:
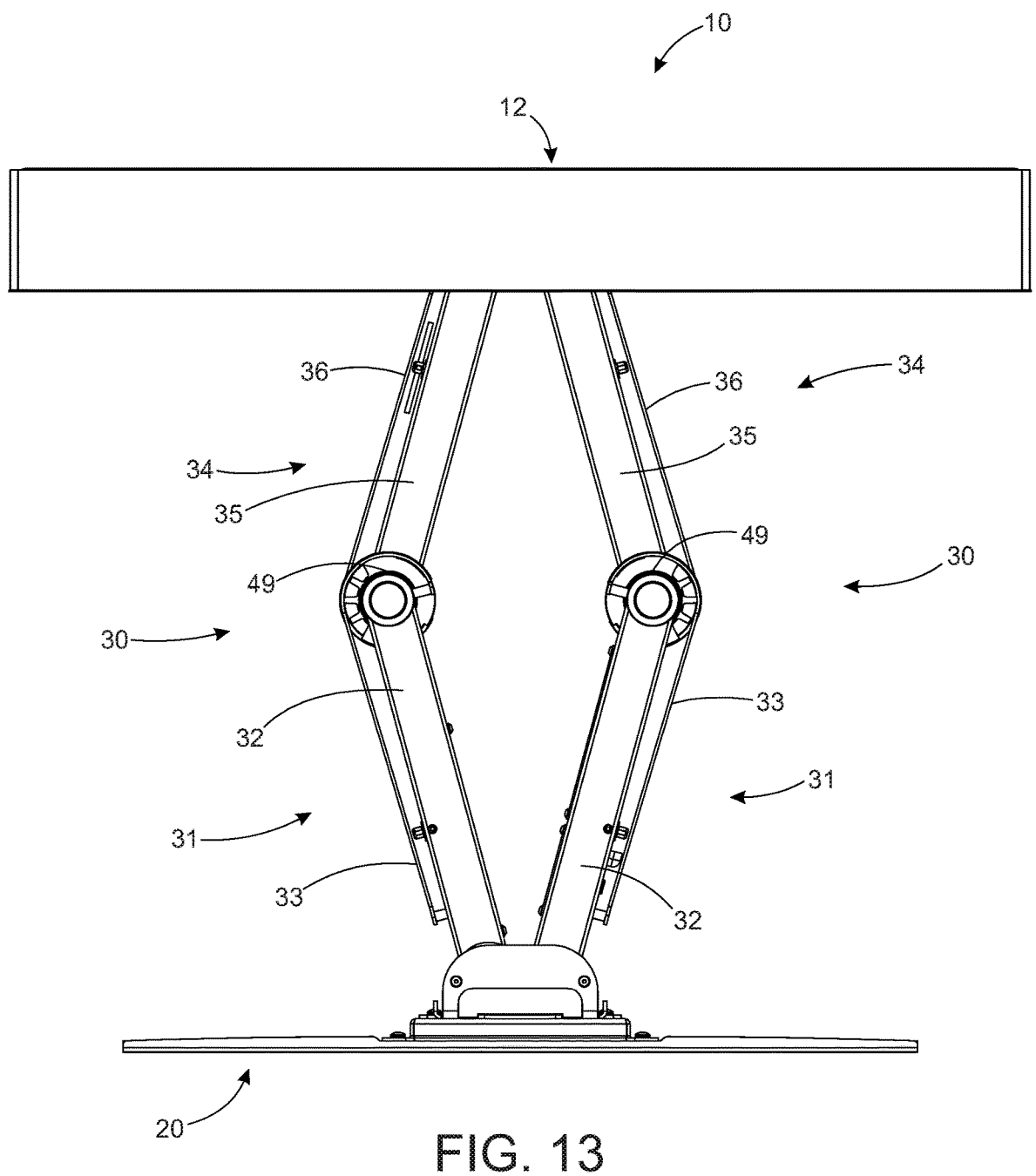
FIG. 13 is a top view of a TV wall mount in an on-wall installation and extended position according to an embodiment.
Figure 14:
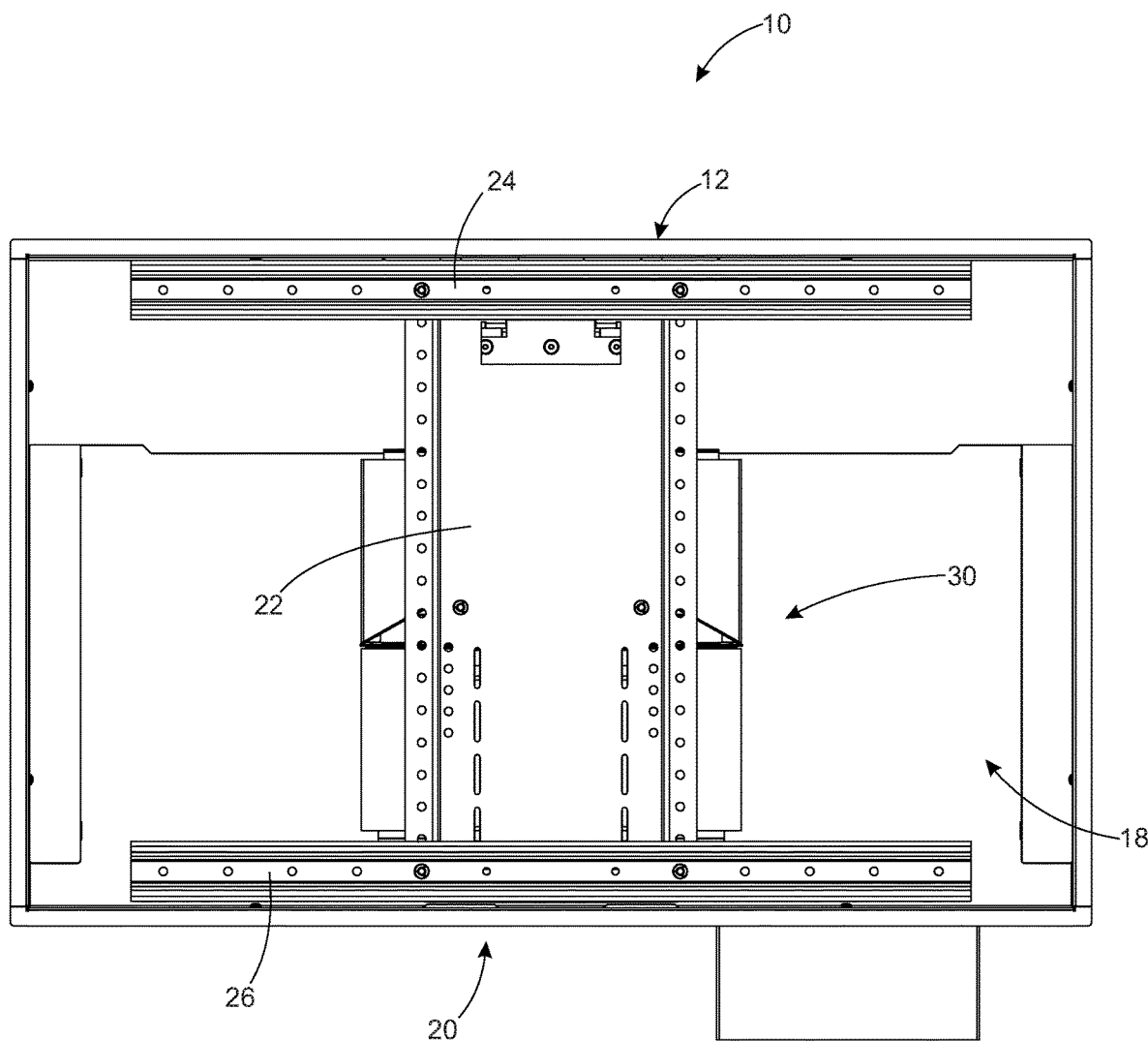
FIG. 14 is a front view of a TV wall mount in an on-wall installation and extended position according to an embodiment.
Figure 15:
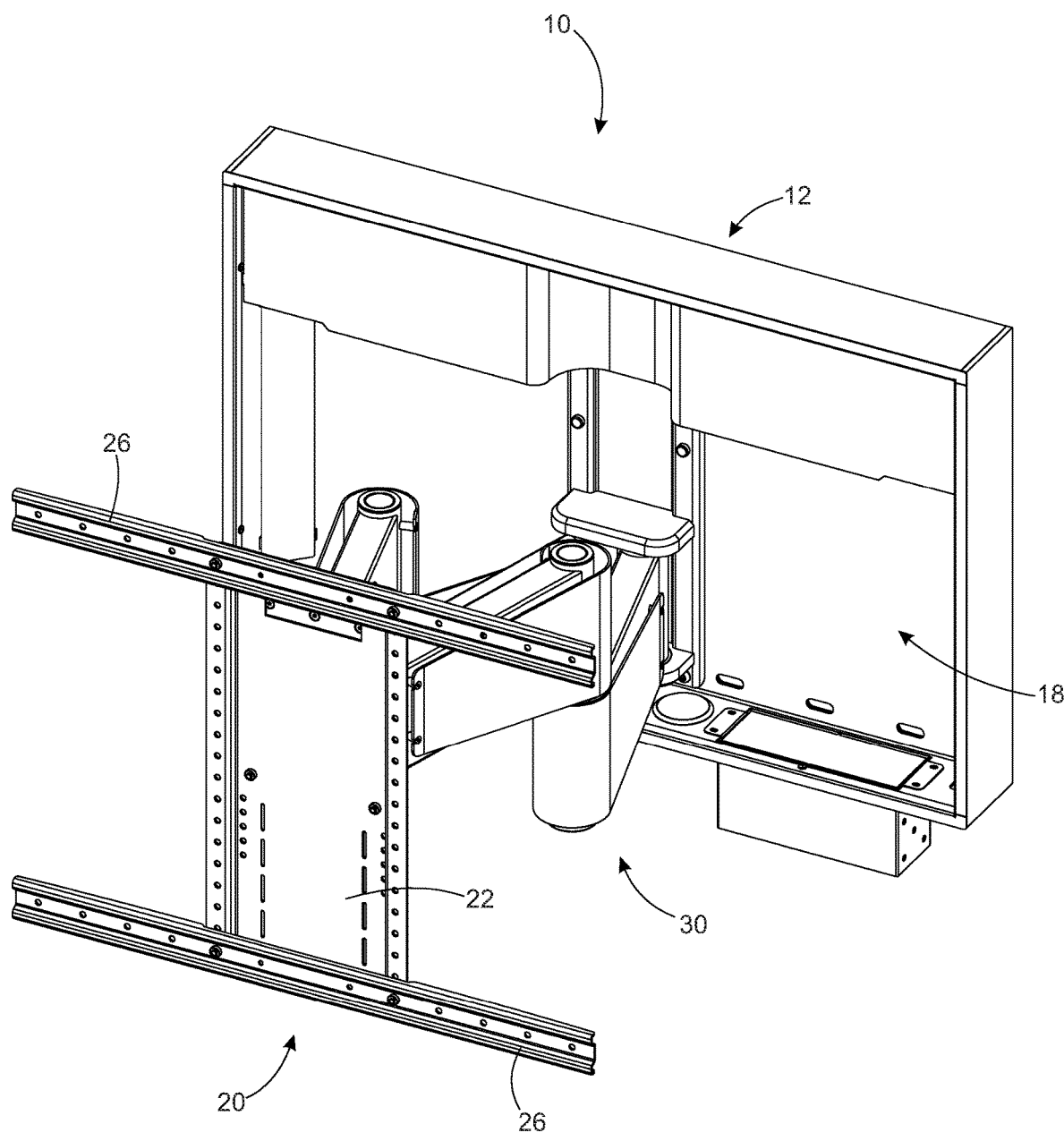
FIG. 15 is a perspective view of a TV wall mount in an on-wall installation and extended position according to an embodiment.
Figure 16:
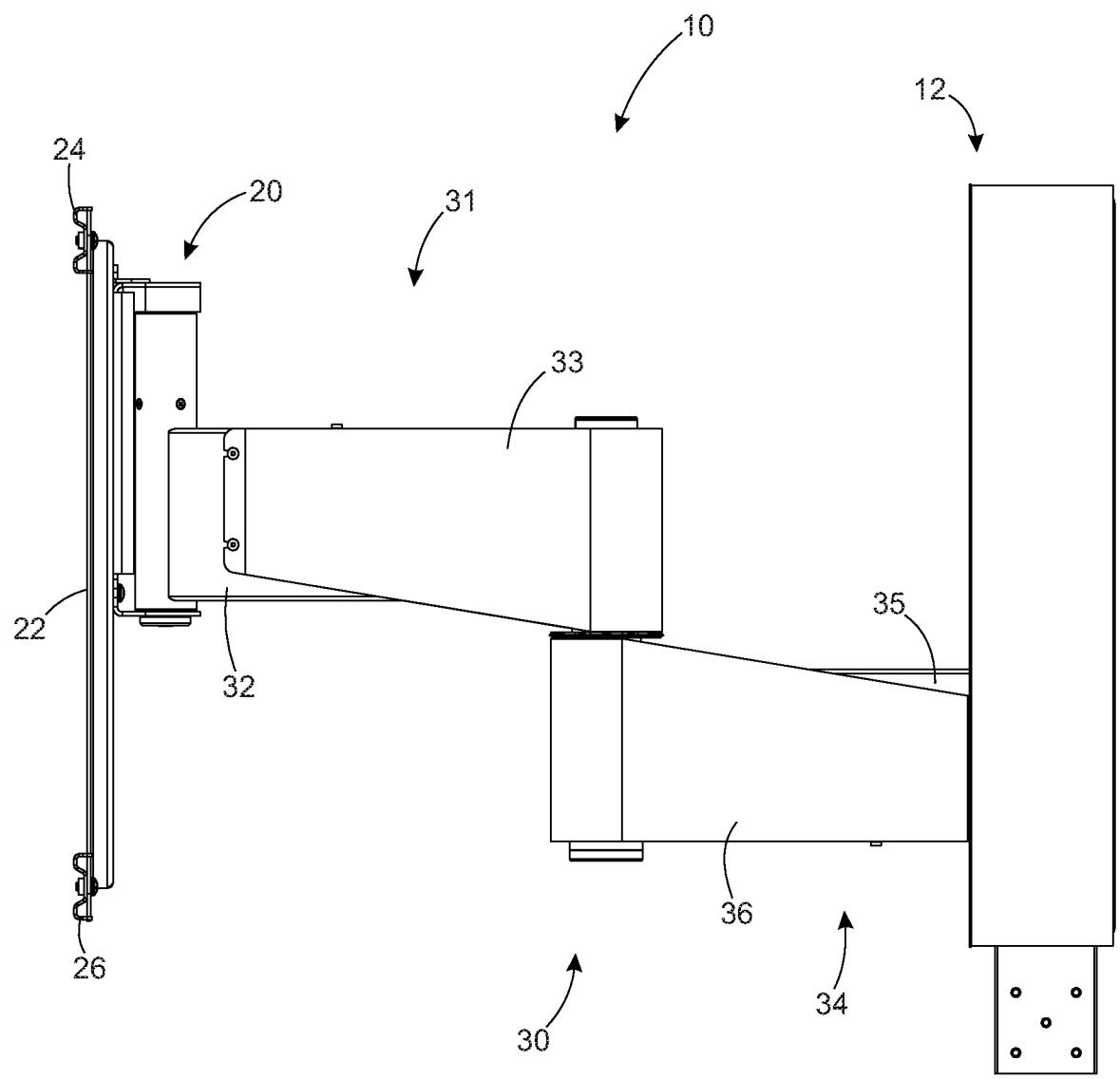
FIG. 16 is a side view of a TV wall mount in an on-wall installation and extended position according to an embodiment.

As discussed above, embodiments of the present invention relate to a motorized articulating TV wall mount for in-wall and on-wall installations wherein the mount is concealed from view.

With embodiments of the present invention, homeowners will have the freedom to place any TV on the wall without having to reorient the whole room just to face the screen. Embodiments will provide dealers with a stealth solution that will handle screens up to 75", be IP controllable, have multiple preset positions and have outstanding design to simplify installation. Embodiments may also have a drive release system to prevent accidental breakage of motorization utilized to move the TV and to enhance safety.

Referring to FIGS. 1-22, an embodiment of a TV wall mount 10 is depicted. The wall mount 10 may include a modular housing 12, with a top wall 13, a first side wall 14, a second sidewall 15, a bottom wall 16 and a rear wall 17 coupled together to form an open box shape defining an inner space 18 formed between each of the walls of the housing 12. The wall mount 10 may further include with articulating arms 30 coupled to the housing 12, wherein the articulating arms are moveable between a fully extended position and a fully retracted position, wherein in the fully retracted position, the articulating arms are completely within the inner space 18, the wall mount 10 may further include TV mounting member 20 having a base member 22 four coupling to the articulating arms 30 and a top member 24 and a bottom member 26 coupled to the base member, wherein the top member 24 and the bottom member 26 couple to a TV in order to hold TV during operation and through all orientation possibilities provided by the wall mount 10. The wall mount 10 may also include cable management system 40 that may be utilized for management of cables, such as, but not limited to, audio/video cables as well as electrical cords.

Each articulating arm may include a first member 31 and a second member 34. The first member 31 includes a first end rotatably coupled to the TV mounting member 20, and a second end rotatably coupled to a first end of the second member 34. A second end of the second member 34 is rotatably coupled to the housing 12 within the inner space 18. This allows the TV mounting member 20 to be extended from the housing 12 and retracted adjacent the housing 12. Further, having two articulating arms operating together allows for various orientations of the TV mounting member 20 in order to adjust the viewing orientation of a TV mounted to the TV mounting member 20. Further, embodiments may include a TV mounting member motor operatively coupled to the TV mounting member 20 to rotate or swivel the TV mounting member 20 angel left or right to face a TV mounted to the TV mounting member 20 in a desired viewing position around the room. The TV mounting member motor may be dedicated solely for swiveling the TV.

Figure 17:
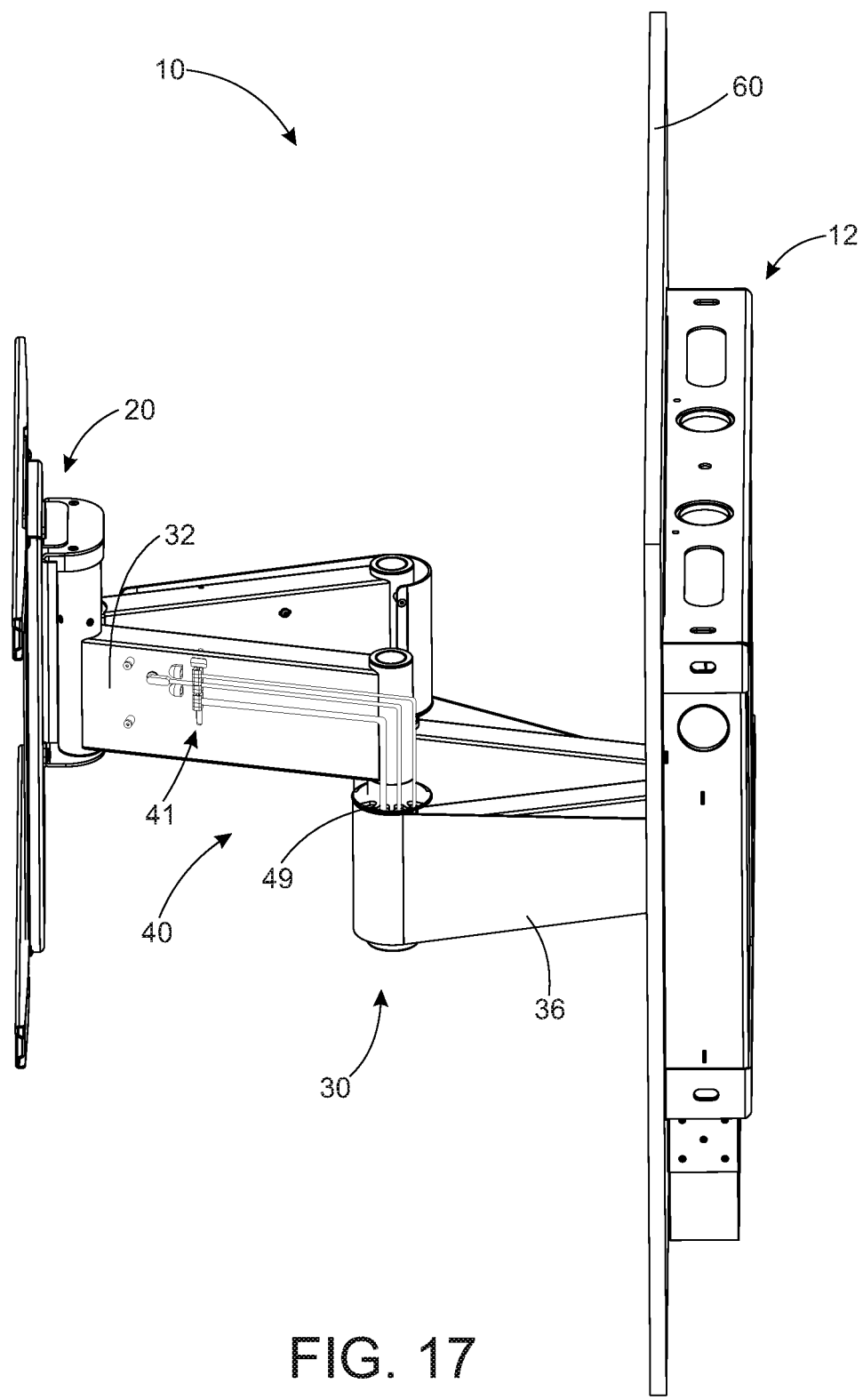
FIG. 17 is a perspective view of a TV wall mount in an extended position showing a cable management system according to an embodiment.
Figure 18:
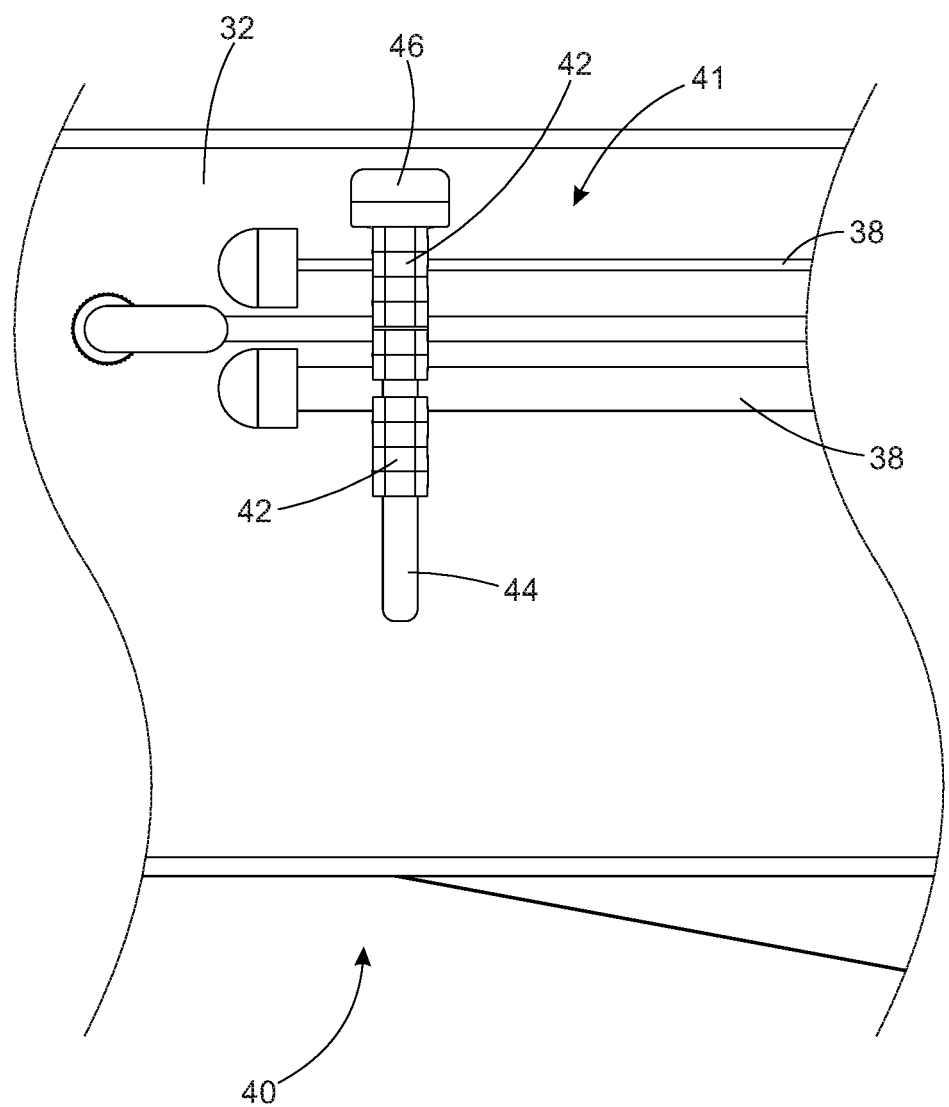
FIG. 18 is a close-up view of a cable management system according to an embodiment.
Figure 19:
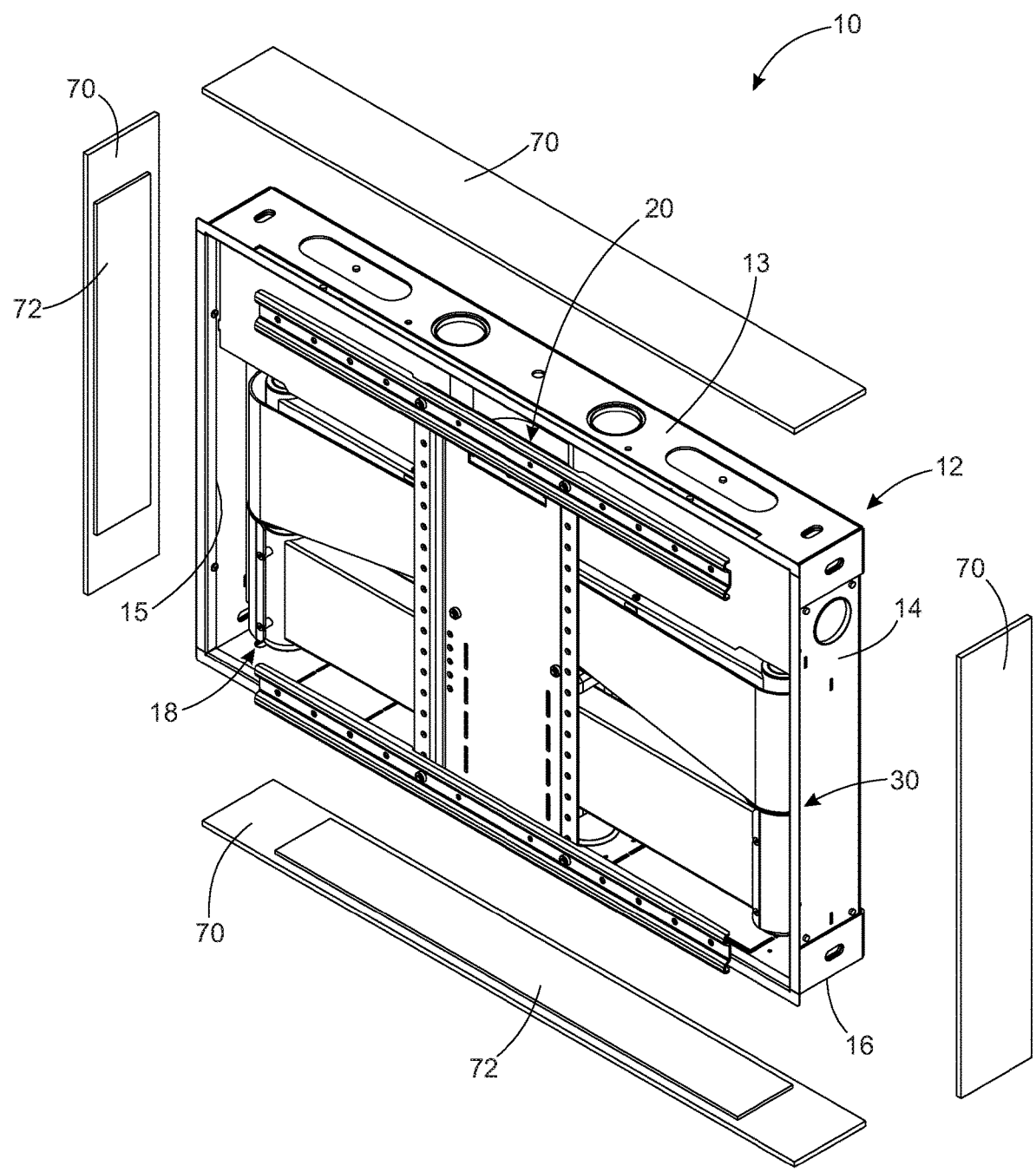
FIG. 19 is a perspective view of a TV wall mount in an on-wall installation and retracted position with trim members exploded according to an embodiment.
Figure 20:
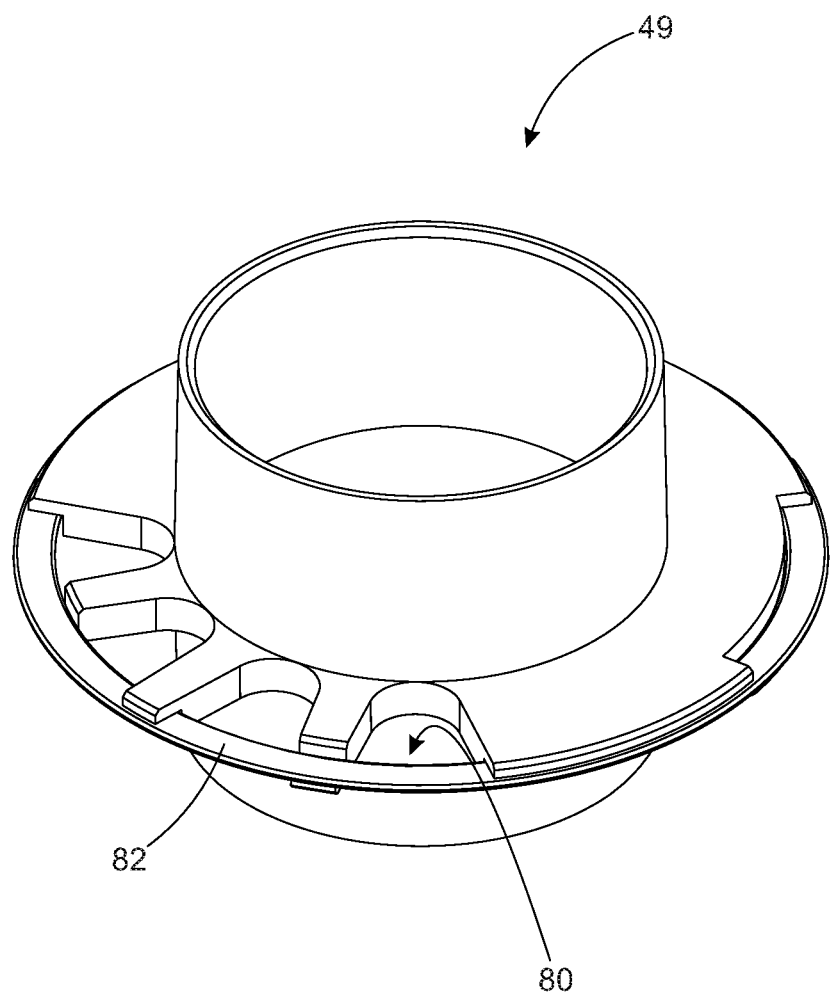
FIG. 20 is a perspective view of an elbow retainer member with a retention ring in a closed position according to an embodiment.
Figure 21:
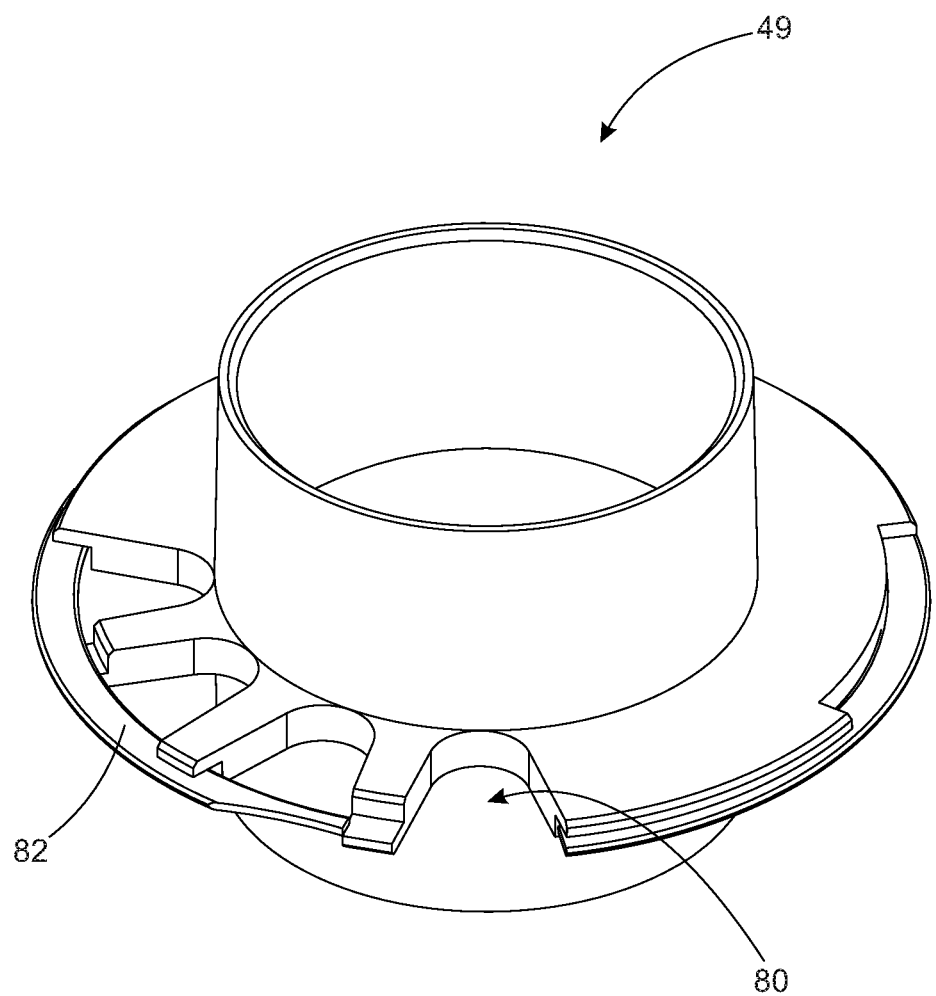
FIG. 21 is another perspective view of an elbow retainer member with a retention ring in a partial open position according to an embodiment.
Figure 22:
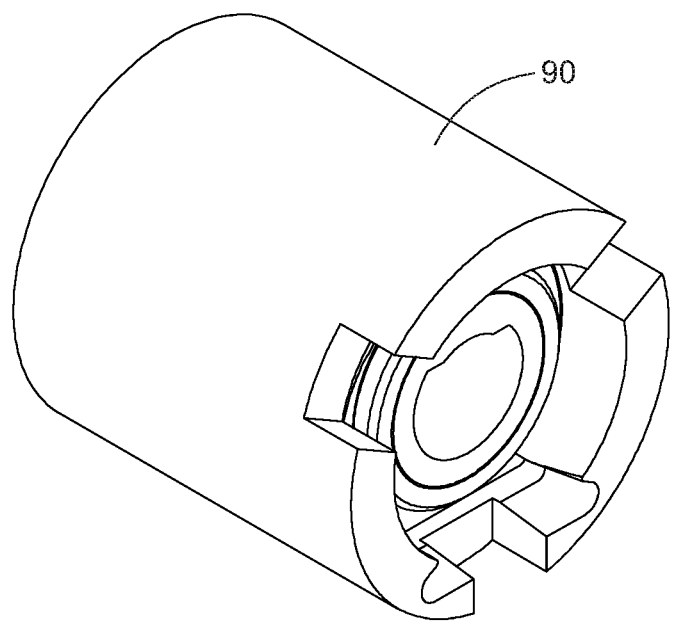
FIG. 22 is a perspective view of a slip clutch according to an embodiment.

Cable management system 40, as shown in FIGS. 17 and 18, includes a plurality of cable management devices 41, each cable management device 41 having a plurality of clamping members 42 slidingly coupled within a channel 44. Each cable management device 41 includes a tightening member 46 engaging each clamping member 42. Cables 38 may be inserted between clamping members and operation of the tightening member 46 tightens the clamping members 42 together to hold the cables 38 in place. The clamping members 42 are able to accommodate cables of any thickness, from thin speaker wire to thicker HDMI cables and the like. In this way, the cable management device 41 allows user/installers to feed any cable in the system 41 and then tighten the adjustable clamps 42 down to secure the cable. The cable management system 40 also includes elbow retainer members 49, as depicted in FIGS. 20 and 21, with one elbow retainer member coupled between the first member 31 of the articulating arm 30 and the second member 34 of the articulating arm 30. The elbow retainer member 49 may include recesses 80 and a rotatable retention ring 82 between open and closed positions, wherein cables 38 may extend into the recesses 80 when the retention ring 82 is opened and be held within the recesses 80 with the retention ring 82 in the closed position. It should be understood that the cable management system 40 may be located on either articulating arm to account for cables, such as power cables, A/V cables and the like that are not always located from the same side of the TV.

In operation, a first cable management device 41 may be coupled to the first member 31 of the articulating arm 30 and a second cable management device 41 may be coupled to the second member 34, wherein cables 38 are coupled to the first cable management device 41 extend through the elbow retainer member 49 and coupled to the second cable management device 41. The cable management system 40 operates to keep the cables 38 in constant connection with the TV and power source, video source, audio source and the like and to maintain the same cable organization and configuration during extension and retraction of the TV mounting member 20 cause by rotation of the articulating arms 30. The first member 31 and second member 34 of the articulating arm 30 each have a cover 33 and cover 36 respectively. The covers 33 and 36 operates to cover the cable management system 40 from view. The covers 33 and 36 are designed to attach easily, but securely, and are further designed with an aesthetic that makes them look like the outer wall of the arm, instead of an external cover. This combination of aesthetics and ease of installation provide a valuable benefit to dealers/installers because existing cable covers on other products have had the problem of popping off or looking cheap, resulting in dealer/installers throwing away the covers and simply using zip-ties to attach to the arms. Cable management system 40 is dedicated and concealed, provides for a unique cable clamping solution to fix cables in place with a unique cable travel path to decrease tension, torsion, and wear and tear. This allows for easier installation, better cable life, and a cleaner looking product.

The articulating arms 30 may include use of planetary gearmotor inside the arm joints formed at locations where each member 31 and 34 are coupled on the ends. Wrist and elbow joints are uniquely designed to allow, motors, gear, clutch, and positioning system in an axial arrangement. Further the articulating arms 30 include hidden shoulder gears that are designed for concealment within the shoulder joint, the shoulder gears operating to move the articulating arms 30.

Additionally, the mount 10 may include a motor with a slip clutch 90 (See FIG. 22) that may be a direct drive or multi-use manual/automatic clutch. The slip clutch 90 is utilized as a multipurpose clutch to allow for both manual and motorized operation. The slip clutch 90 has a unique safety feature that it decouples if an external force is applied to prevent the motor from moving the mount when the external force is applied and limiting harm to anyone operating the mount 10. In operation as the external force is applied, either by a user pulling on the mount to manually adjust the mount or by an accidental collision during motorized operation of the mount, the torque applied to the motorized system by the external force may exceed operational parameters of the motorized drive system. When a load force exceeds the operational parameters of the motorized drive, as determined by the slip clutch 90, the clutch 90 will transition into a slip condition wherein the drive system is disengaged. In this direct drive slip clutch configuration, when the load torque is at the level of the drive torque, the slip clutch 90 operates in an engaged condition and the motorized drive system operates the movement (extension and retraction) of the articulating arms and movement of the mount 10. If an external force is applied to the mount 10, such as by manual operation or collision with the mount during operation, the external force may increase the load torque higher than the drive torque, wherein the slip clutch 90 transitions into a slip condition that disengages the clutch 90 and does not damage the gearing of the drive system. Once the load torque is reduced to the same level of the drive torque, the slip clutch 90 again engages and continues to operate as normal.

The slip clutch system in embodiments of the present invention is revolutionary by preventing the possibility of someone breaking the drive system by pulling or pushing on the mount 10. One of the largest problems with motorized articulating TV wall mounts of the past is that they would very often break in the field. The breakage occurs for at least two common reasons. One reason is that a person thinking it was a manual mount and try to adjust the TV by pulling or pushing on it and actually break the drive system. A second reason is that someone may walk in front of or behind the TV not realizing the mount 10 was moving and colliding with the TV or mount. This collision typically breaks the internal drive systems. These field failures produced costly consequences requiring an installer, such as the original installer, to return to the location of the installation to diagnose the problem, and typically results in a replacement product having to be obtained and reinstalled. Because of these internal gear failures, it has been difficult to prove user error, resulting in disagreement about who should bear the cost of the replacement product. The resulting situation often painted the installer and manufacturer in a bad light and inevitably caused a reduction of trust on the part of the client and a reduction in repeat sales. The slip clutch system of embodiments of the mount 10 eliminates these field failures and the many negative consequences, thereby restoring confidence in motorized wall mounts and creating viable new revenue opportunities for the professionals who install them.

Prior art exists using slip clutches, but they are not direct drive. Further, slip clutches have not been employed for the purposes disclosed with regard to embodiments of present invention and further have not been employed for the purposes disclosed herein.

The wall mount 10 may also include a particular arrangement of roller bearing and ball bearings for weight bearing considerations of the TV held by the mount 10. The mount 10 utilizes an arrangement of roller bearings and ball bearings that allow the radial loads of the bearings to be spread further apart for load carrying capacity, but still allow the motors and associated components to be coaxially located within the roller bearings.

As discussed previously, the wall mount 10 may be an in-wall installation or an on-wall installation without the need of a different housing 12, articulating arm 30, TV mounting member 20 or cable management system 40. For in-wall installations, the housing 12 is recessed within the wall 60 as depicted in FIGS. 1-8. This in-wall installation allows for a fully in-wall gapless motorized mount that can be fully recessed into standard wall construction, allowing your TV to be only ½" from the wall, and thereby concealing the whole mount 10 completely from view.

For on-wall installations, as shown in FIGS. 9-16 and 19 the housing 12 is coupled to a wall 60 with the rear wall 17 of the housing 12 contacting the wall 60. Trim members 70 may be coupled to the walls of the housing 12 by use of any coupling device, such as, but not limited to magnets, wherein the trim provides a more aesthetically pleasing look. Mounted in this way, although the TV rests a few inches from the wall, the housing 12 conceals the mount 10 and all A/V-related cables and devices, providing for a very clean look behind the TV.

Accordingly, this present invention allows for the in-wall and on-wall installations with the same mount 10 giving much flexibility to installers and dealers.

In operation, a software application may be employed for operating the motor and adjusting the mount 10. The software may include the use of selectable boundary maps to prevent wall collision and adjust for in-wall/on-wall installations. The software may be programmed to prevent the TV colliding with the wall. The software is programmed to utilize a numerical variable array in that creates a "boundary map" for different sizes of TV and to differentiate between in-wall and on-wall installations. The boundary map may be automatically established in response to a user entering the size of the TV to establish the general boundary. Other boundary consideration may be provided by the software for use input through means such as selectable considerations like brand of TV, screen type and dimensions of the TV.

This allows for software of the mount 10 to initiate pan/extend commands in a coordinated way to avoid wall contact by the TV. The software is programmed to provide coordinated movements to follow a path always within the previously mentioned boundary path so that the remote-control buttons for Left/Right/Extend/Retract cannot be accidentally held too long to collide with a wall.

The software of the mount 10 may also include a routine or programming whereby machine learning may be utilized to define the "boundary map." They may be accomplished by having the user manually move the TV to various safe non-colliding positions and the microcontroller learning these safe boundaries, or having an automated sequence where the mount 10 would move the TV through a routine that would gently have the TV touch off on the walls and detect the slow speed collisions through motor amperage spikes/stopped motion of the arms to make this process automated. The unit would then apply a safety offset and create automatically a boundary map from the automated learning routine.

Accordingly, the components defining any motorized articulating TV wall mount may be formed of any of many different types of materials or combinations thereof that can readily be formed into shaped objects provided that the components selected are consistent with the intended operation of a motorized articulating TV wall mount. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any motorized articulating TV wall mount may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A motorized articulating TV wall mount kit installable in an on-wall installation or an in-wall installation, the mount kit comprising:
   a housing having an interior space and an opening;
   articulating arms operatively coupled to a rear wall of the housing, wherein the articulating arms are moveable between an extended position and a retracted position, wherein the extended position includes the articulating arms extending through the opening of the housing and the retracted position includes the articulating arms within the inner space and not extending through the opening;
   a tv mounting member coupled to the articulating arms, wherein the articulating arms are coupled between the housing and the tv mounting member;
   a motorized drive system, wherein the motorized drive system is a direct drive comprising a slip clutch coupled to the direct drive, the motorized drive system operating to move the articulating arms, wherein the slip clutch moves from an engaged position to a slip condition in response to an external force applied to the tv mounting member, wherein the external force results in increasing the load torque of the motorized drive system above operating load torque; and
   a cable management system coupled to the articulating arms, wherein the cable management system accommodates cables of any thickness, wherein the cable management system further comprises an elbow retainer member coupled to a shoulder joint between the first member and the second member of the articulating arm, wherein cables are coupled to the elbow retaining member allowing the cables to transition from first member to the second member of the articulating arm without tangling or interference with the articulating arm during movement of the articulating arm.

2. The mount kit of claim 1, further comprising a tv mount motor coupled to the tv mounting member, wherein the tv mount motor operates to swivel the tv mounting member right and left.

3. The mount kit of claim 1, wherein the cable management system comprises at least two cable management devices, one cable management device coupled to a first member of the articulating arm and the other cable management device coupled to a second member of the articulating arm, each cable management device having:
- a plurality of clamping members slidingly coupled within a channel formed in the first member or a channel formed in the second member; and
- a tightening member engaging each clamping member, wherein operation of the tightening member moves the clamping members to tighten around cables inserted between clamping members.

\* \* \* \* \*